E. G. GALE.
Ox-Yoke.

No. 57,887.

Patented Sept. 11, 1866.

Witnesses:
Jas. A. Service
J. M. B. Livington

Inventor:
E. G. Gale
Per Munn & Co.
Attorneys

UNITED STATES PATENT OFFICE.

E. G. GALE, OF HOLLAND, MICHIGAN.

IMPROVEMENT IN BOW-PINS FOR OX-YOKES.

Specification forming part of Letters Patent No. 57,887, dated September 11, 1866.

*To all whom it may concern:*

Be it known that I, E. G. GALE, of Holland, Ottawa county, State of Michigan, have invented a new and useful Improvement in Ox-Yokes; and I do hereby declare that the following is a full, clear, and exact description thereof, which will enable others skilled in the art to make and use the same, reference being had to the accompanying drawings, forming part of this specification.

The present invention consists in a novel manner of securing the bows in the yoke by means of a ratchet or rack bolt passing through the ends of the bow upon the top of the yoke, in combination with a toothed segment engaging with the teeth of such bolt and operated by a suitable lever or handle connected to it, as will be hereinafter described, reference being had to the accompanying plate of drawings, in which—

Figure 1:
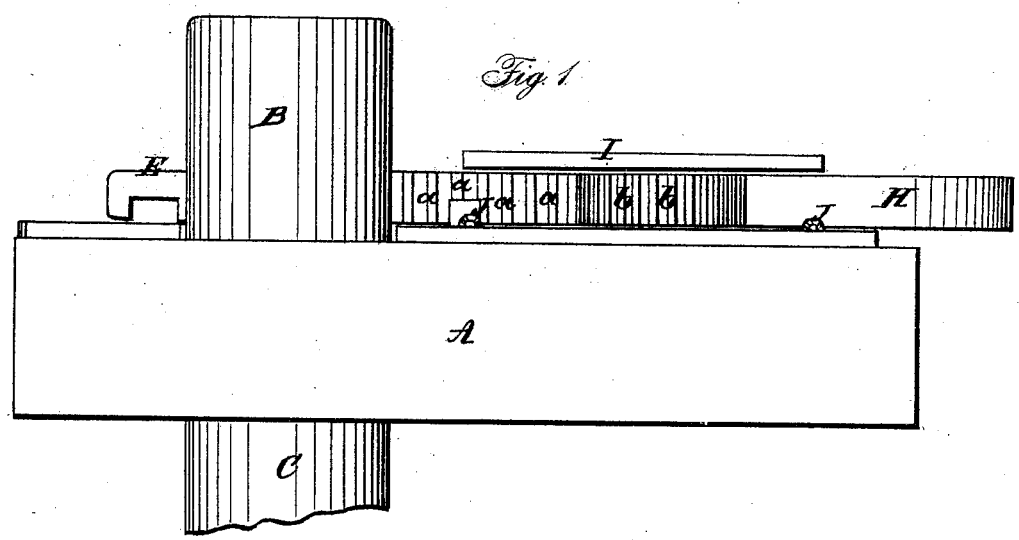
Figure 2:
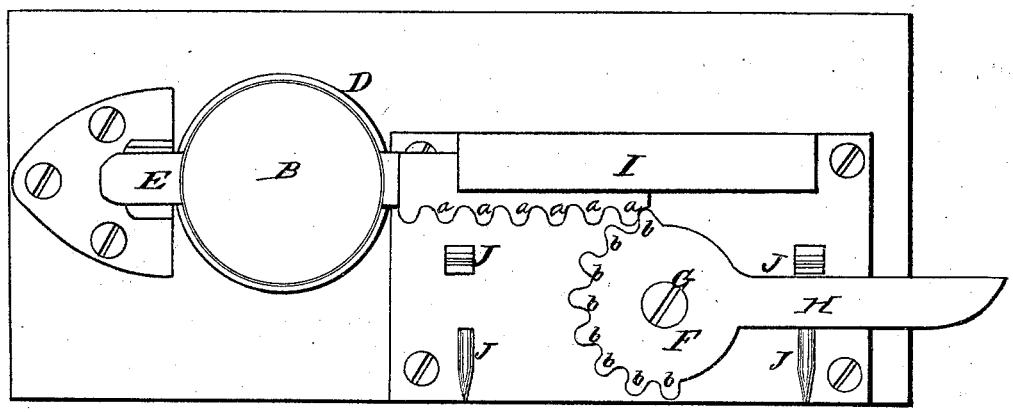

Figure 1 is a plan or top view of a portion of a yoke, showing my improved manner of securing a bow therein; and Fig. 2, a front view of the same.

Similar letters of reference indicate like parts.

A in the drawings represents a sufficient portion of an ox-yoke to illustrate the present invention; B, one end of the bow C, passing through a suitable aperture, D, in the yoke and projecting above the upper side; E, a bolt having a series of teeth, $a$, formed upon one portion of its length, with which engages or interlocks the teeth $b$ of a toothed segment, F, turning upon a center-pin, G, of the yoke, and having a handle or lever-arm, H, secured or formed with it for convenience in turning it, by means of which toothed segment the bolt E can be moved in or out of the yoke-bow end B, playing in and under a suitable guide-bar, I, of the top of the yoke, the lever-handle H being secured in position, whether extending to the right or left upon the yoke, by coming to a seat or rest in and between the slightly-raised projections J J of the yoke at suitable points thereof.

I claim as new and desire to secure by Letters Patent—

Securing the bows of an ox-yoke in and to the yoke by means of toothed rack or ratchet bolts, in combination with toothed sectors engaged with such bolts, when arranged together and upon the yoke, substantially as described.

E. G. GALE.

Witnesses:
 H. D. POST,
 A. ECKERMANN.